United States Patent [19]

Kranz et al.

[11] Patent Number: 4,789,739

[45] Date of Patent: Dec. 6, 1988

[54] PREPARATION OF POLYHALOCOPPER PHTHALOCYANINE PIGMENTS OF HIGH COLOR STRENGTH

[75] Inventors: Joachim Kranz; Karl Schmeidl, both of Ludwigshafen, Fed. Rep. of Germany

[73] Assignee: BASF Aktiengesellschaft, Ludwigshafen, Fed. Rep. of Germany

[21] Appl. No.: 111,615

[22] Filed: Oct. 23, 1987

[30] Foreign Application Priority Data

Oct. 25, 1986 [DE] Fed. Rep. of Germany ....... 3636428

[51] Int. Cl.$^4$ .................. C09B 47/04; C09B 47/08
[52] U.S. Cl. .................... 540/137; 540/136; 540/138
[58] Field of Search ........... 540/136, 137, 138

[56] References Cited

U.S. PATENT DOCUMENTS

| | | | |
|---|---|---|---|
| 3,353,977 | 11/1967 | Kranz et al. | 106/288 |
| 3,730,750 | 5/1973 | Fabian | 160/309 |
| 4,680,387 | 7/1987 | Kranz | 540/136 |

*Primary Examiner*—Richard L. Raymond
*Attorney, Agent, or Firm*—Oblon, Fisher, Spivak, McClelland & Maier

[57] ABSTRACT

Polyhalocopper phthalocyanine pigments of high color strength are prepared by recrystallizing the finely divided agglomerated crude pigment in a heterogeneous aqueous organic phase at elevated temperatures by a process in which the aqueous organic phase used is a heterogeneous mixture of an aliphatic ketone having a total of 3 to 9 carbon atoms and water. The process gives the pigments in the form of spherical granules which are dust-free or have a low dust content. The pigments give deep, brilliant colorations of pure hues.

15 Claims, No Drawings

PREPARATION OF POLYHALOCOPPER PHTHALOCYANINE PIGMENTS OF HIGH COLOR STRENGTH

BACKGROUND OF THE INVENTION

Field of the Invention

The halogenation of copper phthalocyanine gives an amorphous to microcrystalline agglomerated crude polyhalocopper phthalocyanine which, because of the high degree of agglomeration is opaque and has a low color strength. For this reason, the crude pigment is converted by recrystallization into pigmentary forms having optimum color properties. This process, also referred to as conditioning or finishing, is carried out, for example, at elevated temperatures in 90-98% strength by weight sulfuric acid, in xylene (DE-B-No. 2,013,818), o-nitrophenol (DE-C-No. 1,242,180) or in a mixture of benzoic acid and/or alkylbenzoic acids and water at from 80° to 130° C. (DE-A No. 3,442,118).

Pigmentary forms having interesting color properties are obtained by heat treatment in o-nitrophenol. However, this conditioning medium has considerable disadvantages: it has a strong odor since it has a marked vapor pressure at as low as room temperature, it sublimes readily and it is volatile together with steam. Other disadvantages are that o-nitrophenol has a low melting point and marked solubility in water, resulting in losses during the recovery process.

A further disadvantage is that the o-nitrophenolate anion formed in the removal of the nitrophenol by the addition of an alkali metal hydroxide has a high affinity for the polyhalocopper phthalocyanine pigment, so that a long wash process is required for substantially quantitative removal of the nitrophenolate.

Finishing in xylene according to DE-B-No. 2,013,818, in which the pigmentary form is obtained directly in the form of a nonagglomerated powder by freeze-drying, must be carefully carried out and monitored to prevent supercrystallization.

SUMMARY OF THE INVENTION

It is an object of the present invention to provide a process for the conversion of polyhalocopper phthalocyanine which gives pigmentary forms having good color properties by an environmentally compatible process and makes it possible to prepare pigmentary forms optimally adapted to the various intended uses.

We have found that this object is achieved by a process for the preparation of polyhalocopper phthalocyanine pigments of high color strength by recrystallizating the finely divided, agglomerated crude pigment in a heterogeneous, organic aqueous phase at elevated temperatures, wherein the organic aqueous phase used is a heterogeneous mixture of aliphatic ketones having a total of 3 to 9 carbon atoms and water.

The process provides powder-soft polyhalocopper phthalocyanine pigments which give deep transparent, brilliant colorations having pure hues.

DETAILED DESCRIPTION OF THE PREFERRED EMBODIMENTS

In the process according to the invention, the pigments are obtained in the form of spherical granules having diameters up to 5 mm. The granules which contain from 60 to 70% by weight of pigment, the remainder being water and ketone in a weight ratio of about 3:2, can be dried, for example in a drying drum, with shape retention. The resulting granules have a low dust content and are readily dispersible.

The process according to the invention is carried out in general as follows: the polyhalocopper phthalocyanine (polyhalo-CuPc) obtained in the synthesis is suspended in water in the form of the press cake, the ketone is added and the mixture is heated to the desired temperature. In the conversion to the pigmentary form comprising very uniform and compact crystals (particles), it is critical that the crude pigment is completely surrounded by the ketone. In the case of the water-soluble ketones, such as acetone and diethyl ketone, the formation of the heterogeneous phase is forced by the addition of salt. This can also be achieved by adding an alkali metal hydroxide solution.

Suitable polyhalo-CuPc compounds are polychloro-CuPc having from 10 to 16 chlorine atoms and polybromochloroCuPc having from 0 to 13, preferably from 4 to 12, chlorine atoms and from 14 to 2, preferably from 12 to 4, bromine atoms in the molecule.

Examples of suitable aliphatic ketones are acetone, methyl ethyl ketone, diethyl ketone, methyl n-propyl ketone, methyl isopropyl ketone, methyl n-butyl ketone, methyl isobutyl ketone, methyl isoamyl ketone, diisopropyl ketone, di-n-propyl ketone, di-n-butyl ketone and diisobutyl ketone and mixtures of these. Among these, methyl ethyl ketone, methyl isobutyl ketone, methyl n-propyl ketone and methyl isopropyl ketone are preferred for technical reasons. Methyl isobutyl ketone is very particularly preferred. The weight ratio of crude pigment to ketone is in general from 1:0.3 to 1:2.0, preferably from 1:0.3 to 1:1.5.

The amount of water is not critical if the mixture is miscible before, during and after the crystallization; however, a large amount of water should be avoided since this reduces the space-time yield. As a rule, the weight of water used is from 3 to 4 times that of the crude pigment (calculated as dry substance).

Where water-soluble or partially readily soluble ketones are used, a salt or an alkali metal hydroxide solution is added to the aqueous medium in order to form a second ketone-containing phase, which is required for the recrystallization. Suitable salts here are sodium chloride, potassium chloride, sodium sulfate and calcium chloride, preferably sodium chloride. The same effect can be obtained by adding sodium hydroxide solution or potassium hydroxide solution.

Pigmentary forms which give particularly pure colorations having a high color strength are obtained if strong bases, such as sodium hydroxide solution or potassium hydroxide solution, are added to the aqueous mixture. The amount of these bases is chosen so that the aqueous phase is alkaline at the end of the finishing operation.

The amount of these bases can be up to 2 parts by weight per 100 parts by weight of crude pigment. From 1 to 1.6 parts by weight of alkali metal hydroxide, such as sodium hydroxide or potassium hydroxide, are preferably used per 100 parts by weight of crude pigment.

The recrystallization is carried out at the boiling point of the mixture, to 120° C. Where temperatures above the boiling points of the azeotropic mixtures of ketone and water are used, the recrystallization is carried out under superatmospheric pressure. The procedure is preferably carried out at from 55° to 105° C., under atmospheric or superatmospheric pressure. When the mixture containing the crude pigment is stirred and heated, the pigment is obtained in the form of spherical granules having a diameter of about 0.5–5 mm.

At the end of the crystallization, the granules can readily be isolated by decanting, but preferably by filtration under suction, and washing. The granules retain their form when dried. Drying is advantageously carried out in a drying drum. The mixture of ketone and water which is removed during the drying process is condensed, and worked up together with the filtrate and wash water obtained during isolation, to give the ketone.

The conversion mixture can also be worked up by distilling the ketone directly from the conversion mixture, together with water in the form of an azeotrope, some of the granules breaking up. The pigment is then isolated from the aqueous phase in a conventional manner by filtration under suction, and is washed neutral with water and dried.

The Examples which follow illustrate the process. Parts and percentages are by weight.

EXAMPLE 1

In a stirred vessel, 75 parts of polybromochlorocopper phthalocyanine (chlorine content 7%, bromine content 58%) in the form of a 30% strength press cake are mixed with 45 parts of methyl isobutyl ketone and 4 parts of 20% strength sodium hydroxide solution, and the stirred mixture is refluxed. Flushing begins at about 80° C.: the crude pigment passes into the organic phase with displacement of the water, spheres slowly forming from the ketone-rich solid mixture.

After refluxing has been carried out for 12 hours (89° C.), the ketone is distilled off. The recrystallized green pigment is filtered off, washed and dried.

73 parts of green pigment which gives deep colorations having pure hues and high transparency are obtained. The resulting pigment has good powder softness and, in terms of color properties, is equivalent to that obtained by the prior art process.

EXAMPLES 2 TO 8

The procedure described in Example 1 is followed, except that, instead of methyl isobutyl ketone, the ketones stated below are used in the amount indicated and at the temperature given. The pigments obtained have virtually the same color properties. When acetone and diethyl ketone are used, sodium chloride is also added to achieve complete formation of the second phase, which is important for finishing.

| Example | Ketone | bp. (°C.) | bp. of the azeotrope (°C.) | Amount of ketone | NaCl |
|---------|--------|-----------|----------------------------|------------------|---------|
| 2 | Acetone | 56 | 58 | 105 parts | 90 parts |
| 3 | Methyl ethyl | 79 | 73 | 107 parts | — |
| 4 | Methy isopropyl | 92 | 78 | 60 parts | — |
| 5 | Methyl n-propyl | 102 | 85 | 65 parts | — |
| 6 | Diethyl | 100 | 83 | 45 parts | 10 parts |
| 7 | Diisopropyl | 123 | 90 | 38 parts | — |
| 8 | Methyl isoamyl | 144 | 95 | 34 parts | — |

EXAMPLE 9

200 parts of crude polybromochloro-CuPc (containing 7% of Cl and 58% of Br), in the form of the 30% strength aqueous press cake, are stirred with 260 parts of methyl ethyl ketone and 10 parts of 20% strength sodium hydroxide solution in an autoclave for 8 hours at 100° C. Thereafter, the autoclave is let down, the ketone is distilled off and the pigment is isolated as in Example 1.

194 parts of a green pigment are obtained which has very similar color properties and performance characteristics to the pigment obtained in Example 1.

Working up the mixture after recrystallization can also be carried out as follows. After the pressure vessel has been cooled, the pigment granules are separated from the liquid phase by filtration, decanting or sieving, washed briefly with water to remove alkali and salt adhering to the surface (there are no ions enclosed in the granules; the conductivity test is negative) and dried. The resulting pigmentary form, which has a low dust content or is dust-free, can then be used directly, ie. without pulverization or milling.

EXAMPLES 10 TO 16

The procedure described in Example 9 is followed, except that the methyl ethyl ketone is replaced with the stated ketones in the amount indicated. The resulting green pigments have similar color properties and performance characteristics.

| Example | Ketone | Amount of ketone | Amount of NaCl added |
|---------|--------|------------------|----------------------|
| 10 | Acetone | 320 parts | 150 parts |
| 11 | Methyl isopropyl ketone | 160 parts | — |
| 12 | Methyl n-propyl ketone | 160 parts | — |
| 13 | Methyl isobutyl ketone | 120 parts | — |
| 14 | Diethyl ketone | 115 parts | — |
| 15 | Diisopropyl ketone | 100 parts | — |
| 16 | Methyl isoamyl ketone | 60 parts | — |

EXAMPLE 17

In a stirred vessel, 100 parts of crude polybromochlorocopper phthalocyanine (containing 26% of Cl and 33% of bromine), in the form of the 30% strength aqueous press cake, are conditioned together with 60 parts of methyl isobutyl ketone and 8 parts of 20% strength sodium hydroxide solution for 10 hours at the reflux temperature (89° C.). Working up is carried out simllarly to Example 1 to give a powder-soft green pigment whose color properties correspond to those of the prior art pigments. Yield: 96%.

EXAMPLE 18

The procedure described in Example 17 is followed, except that 90 parts of methyl isopropyl ketone are used instead of 60 parts of methyl isobutyl ketone, and the crystallization is carried out in a pressure vessel at 100° C. The pigment granules isolated have performance characteristics and color properties similar to those of the pigment obtained according to Example 17.

EXAMPLE 19

100 parts of crude polychloro-CuPc (49.5% of Cl), in the form of a 33% strength aqueous press cake, 70 parts of methyl isobutyl ketone and 5 parts of 20% strength NaOH are refluxed for 10 hours (89° C.), while stirring. The resulting pigment granules are removed by sieving, washed with water and dried.

95 parts of green pigment are obtained whose color strength, brilliance, purity, transparency and hue correspond to those of the prior art pigments. The ketone is recovered from the sieve liquid by distillation.

EXAMPLE 20

The procedure described in Example 19 is followed, except that 60 parts of diisopropyl ketone are used instead of 70 parts of methyl isobutyl ketone. The resulting green pigment has virtually the same color properties and performance characteristics as that obtained according to Example 19.

EXAMPLE 21

The procedure described in Example 19 is followed, except that 100 parts of diethyl ketone are used instead of 70 parts of methyl isobutyl ketone, and crystallization is carried out as described in Example 9 in a pressure vessel at 100° C. The resulting pigment granules have color properties and performance characteristics similar to those of the pigment obtained according to Example 19.

EXAMPLE 22

If, instead of 70 parts of methyl isobutyl ketone, only 50 parts of methyl isoamyl ketone are used but the procedure is otherwise carried out similarly to Example 19, green pigments having very good color properties are obtained both at the reflux temperature (89° C.) and under superatmospheric pressure at 100° C.

What is claimed as new and desired to be secured by Letters Patent of the United States is:

1. A process for the preparation of a polyhalocopper phthalocyanine pigment of high color strength by recrystallizing the finely divided agglomerated crude pigment in a heterogeneous aqueous organic phase, which is a mixture of an aliphatic ketone having a total of 3 to 9 carbon atoms and water, at elevated temperatures and isolating the pigment.

2. A process as claimed in claim 1, wherein the recrystallization is carried out at the boiling point of the mixture to 120° C.

3. A process as claimed in claim 1, wherein the organic phase used is a $C_4$–$C_7$-alkanone.

4. A process as claimed in claim 2, wherein the organic phase used is a $C_4$–$C_7$-alkanone.

5. A process as claimed in claim 1, wherein the weight ratio of crude pigment to ketone is from 1:0.3 to 1:2.0.

6. A process as claimed in claim 2, wherein the weight ratio of crude pigment to ketone is from 1:0.3 to 1:2.0.

7. A process as claimed in claim 3, wherein the weight ratio of crude pigment to ketone is from 1:0.3 to 1:2.0.

8. A process as claimed in claim 4, wherein the weight ratio of crude pigment to ketone is from 1:0.3 to 1:2.0.

9. A process as claimed in claim 1, wherein the aqueous phase contains, in solution, a salt, an inorganic metal hydroxide or a mixture of these.

10. A process as claimed in claim 9, wherein the aqueous phase contains sodium hydroxide, potassium hydroxide or a mixture of these.

11. A process as claimed in claim 4, wherein the aqueous phase contains sodium hydroxide, potassium hydroxide or a mixture of these.

12. A process as claimed in claim 8, wherein the aqueous phase contains sodium hydroxide, potassium hydroxide or a mixture of these.

13. A process for the preparation of a polyhalocopper phthalocyanine pigment of high color strength by recrystallizing the finely divided agglomerated crude pigment in a heterogeneous aqueous organic phase, which is a mixture of one or more $C_4$-$C_7$-alkanones and water, at the boiling point of the mixture to 120° C., the weight ratio of crude pigment to ketone being from 1:0.3 to 1:2, and isolating the pigment.

14. A process as claimed in claim 13, wherein the aqueous phase contains, in solution, a salt, an inorganic metal hydroxide or a mixture of these.

15. A process as claimed in claim 13, wherein the aqueous phase contains sodium hydroxide, potassium hydroxide or a mixture of these.

* * * * *